United States Patent [19]

Izumine

[11] Patent Number: 4,848,521
[45] Date of Patent: Jul. 18, 1989

[54] BRAKE DISK

[75] Inventor: Zenzo Izumine, Hamamatsu, Japan

[73] Assignee: Yutaka Giken Co., Ltd., Shizuoka, Japan

[21] Appl. No.: 196,077

[22] Filed: May 19, 1988

[30] Foreign Application Priority Data

May 21, 1987 [JP] Japan .............................. 62-75144[U]

[51] Int. Cl.⁴ ............................................. F16D 65/12
[52] U.S. Cl. .......................... 188/18 A; 188/218 X L
[58] Field of Search ................... 188/18 A, 71.1, 73.1, 188/73.35, 73.37, 73.38, 205 A, 206 R, 218 X L

[56] References Cited

U.S. PATENT DOCUMENTS

| | | | |
|---|---|---|---|
| 3,405,784 | 10/1968 | Henry-Biabaud | 188/18 A |
| 4,282,952 | 8/1981 | Bartley | 188/18 A |
| 4,662,482 | 5/1987 | Bass | 188/18 A |
| 4,749,065 | 7/1988 | Loeber | 188/18 A |

Primary Examiner—Duane A. Reger
Attorney, Agent, or Firm—Michael N. Meller

[57] ABSTRACT

A brake disk assembly is provided wherein the friction disk section has protrusions on the portion of the disk nearer the hub spoke like that overlap joining protrusions from the hub section. The protrusions are joined with stepped size pins that fit a first size opening in the hub section and a second size opening in the disk section. The pins provide resiliency such that in drag in the direction perpendicular to the shaft of the hub, there is very small available motion yet expansion on the part of the disk is accommodated by motion translated through the resiliency achieved by the pins in the different size openings.

8 Claims, 4 Drawing Sheets

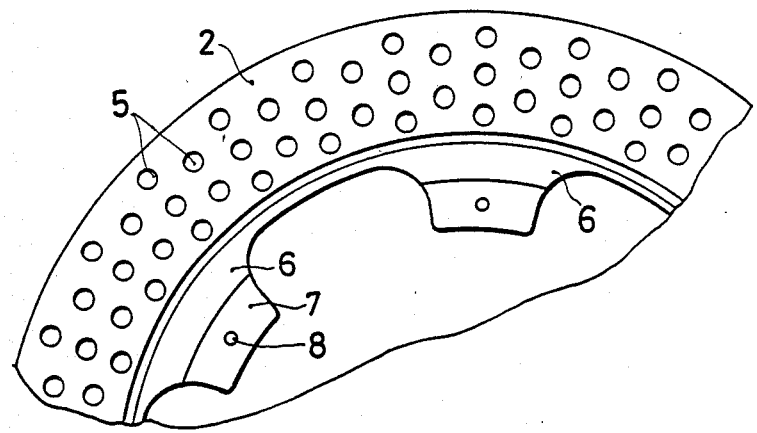
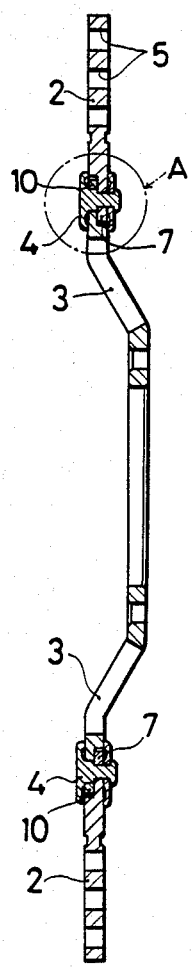
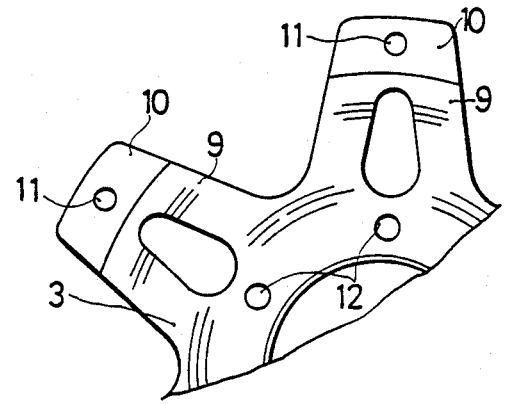
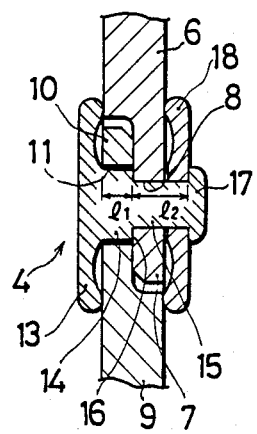

BRAKE DISK

FIELD OF THE INVENTION

Field of the invention is in disk brakes of the type wherein there is a ring shaped friction or braking section that is supported by a hub section.

BACKGROUND OF THE INVENTION

In the disk braking field, a floating type has developed wherein the braking section and the hub section are each a separate unit that are interconnected to each other in such a manner that there is some clearance between the two sections to allow them to move and to accommodate changes in physical size due to changes in temperature and stresses in the materials. This type of brake disk provides an advantage in that the braking surface of the braking section is free of distortion and remains unchanged, even when the braking section becomes thermally expanded by the heat produced by friction during brake application. With this type of construction the thermal expansion is then uniformly distributed due to the simple ring shape without having the stresses confined by the hub section.

In the prior art, the disk brake and the hub section have been joined in one instance by semi-circular concave pieces which when paired, permit relative movement between the braking section and the hub. This is described in Japanese publication to Jikkaisho, Ser. No. 60-3333.

In another type structure in the prior art, floating pins are used with a loose fit through holes provided in mutually overlapping portions of the braking and hub sections. This is described in the Japanese publication to Jikkaisho, Ser. No. 61-104842.

In each of the two prior art examples, there is generated at the point of intersection of the hub portion with the braking portion, a wedge type action which results in large surface pressure, and concern over durability of the connection. Further, where there is mutual overlapping as in the second of the two prior art techniques, there is a thicker joint and mounting space may be limited due to the overlapping portions of the joints.

SUMMARY OF THE INVENTION

The invention provides a brake disk with a ring-shaped braking or friction section that has a plurality of inner members provided on its inner circumferential surface in such a manner that they project therefrom toward the hub and the hub section is provided with outer members of the same number on its outer circumferential surface in such a manner as to project therefrom. A connecting hole is provided in an end portion of the braking section member and the hub section member of each joint so that the joints may be interconnected by a connecting pin inserted through the connecting holes. Each of the inner and outer joints is reduced in thickness to approximately half so that the total thickness of the inner section does not greatly exceed that of the individual protrusions, each protrusion is adjacent a mating arc on the piece against which it rests and the hole in one overlapping member has a different size than the other overlapping member. The pin has a stepped cross-section such that when it is inserted through the connecting holes, one of the protrusions is essentially body bound at one size of the pin and the other protrusion is essentially body bound by the other size of the pin. The pin in turn is resiliently held in position between the joints.

It will then be apparent in operation that the connecting pin securely connects in a resilient fashion, yet braking friction or drag on the disk is transmitted to the flat body-bound portions of the stepped parts of the pin to the hub section.

Since the connecting pin is resiliently positioned in the connecting hole, thermal expansion of the disk braking section is absorbed, yet there is no clattering noise when the vehicle is running because both the inner and outer joints are resiliently joined at flat surfaces with respect to each other.

BRIEF DESCRIPTION OF THE DRAWINGS

FIG. 2 is a sectional view taking along the lines 2—2 of FIG. 1.

FIG. 3 is a partial front view of the braking section.

FIG. 4 is a partial front view of the hub section.

FIG. 5 is an enlarged view of the portion (a) in FIG. 2.

FIG. 6 is a sectional view corresponding to FIG. 5 and showing a portion of another embodiment of this invention.

DETAILED DESCRIPTION

Figure 1:
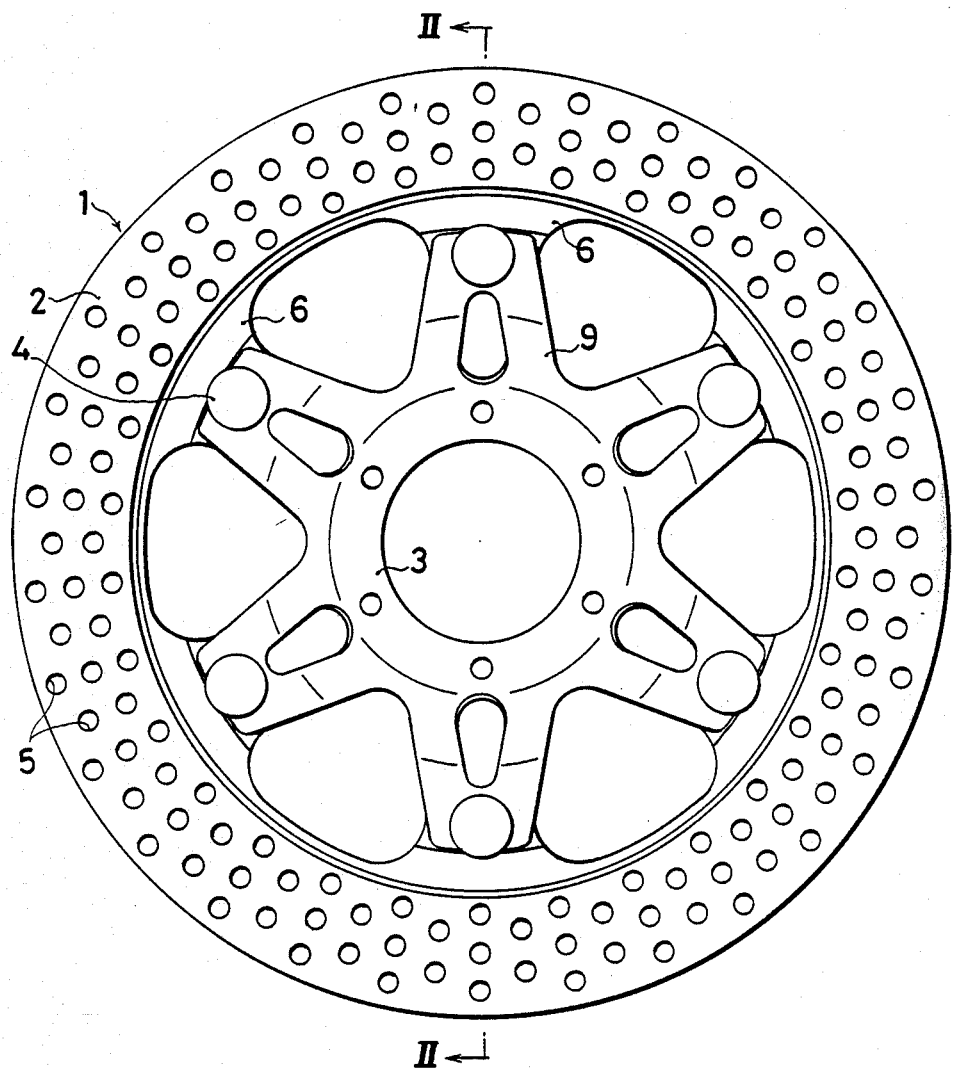
FIG. 1 is a front view of an embodiment of the invention.

Referring to FIGS. 1 and 2, which are respectively the front view and a side view of the invention, the side view being taken along the lines II—II, the floating disk brake of the invention 1 comprises a braking or friction disk section 2 and a hub section 3. The hub section 3 has spoke-like webs that are connected to the braking section 2 by pins 4. Braking section 2 is ring-shaped and preferrably is free to expand and consequently while the drag of braking friction on the portion 2, must be directly transmitted to the hub freedom should be maintained to uniformly distribute distortion in the member 2, with respect to the hub 3. The hub 3 has a number of vent holes and braking section 2 has a number of vent holes 5. The spoke portions of the hub 3 are labeled element 9.

In FIG. 2, wherein like reference numerals are employed, the details in the section (A) of the pin 4 are shown wherein the pin 4 has a large head and the protruding portions 7 and 10 of the braking section 2 and the hub 3 overlap fit into arc shaped locations and are reduced to about half their thickness. The hole openings for the pin 4 are larger in one of the overlapping sections than in the other.

Referring next to FIG. 3 wherein again like reference numerals are employed the reduction in thickness and arc is shown in the region 7, of the braking section and the hole for the pin 4 is labeled 8.

Referring next to FIG. 4, again the reduced thickness overlapping section of the hub is labeled element 10, and the hole is labeled element 11. In FIG. 4 a bolt circle of holes 12 is provided for attachment of the hub to a axle or other shaft.

Referring next to FIG. 5, which is an enlarged view of the section labeled (A) in FIG. 2, in which the hub section 3 complementerily overlaps the protrusions on the braking section, the protrusion of the hub section is labeled 10, and the protrusion on the braking section is labeled 7. The connecting pin 4 is inserted through the connecting holes 8 and 11. The connecting pin 4 comprises a dish springlike head portion 13 having a spring action and a shaft portion consisting of a large diameter portion 14 and a small diameter portion 15 at a step 16. The pin in turn holds in place an elastic washer 18, with a caulking or riveted head portion 17, attached to the end of the shaft portion and holding the assembly in riveted type relationship. Length $l_1$ of the large diameter portion is made approximately equal to the thickness at the joint 10, while length $l_2$ of the small diameter portion is made such that the joint 10 may be allowed to move slightly in the axial direction as accommodated by the resilience of the elastic washer 18.

In such construction, the connecting pin 4 is then held resiliently in the overlapping joint 7 and 10 by the elastic washer 18. Thus both elements 7 and 10 can move in the radial direction for so much as the movement provided by the relatively body bound yet loose fit of the pin 4 in the connecting hole 11, and in the axial direction for so much as is permitted by the flexing of the elastic washer 18 and the head portion 13, thus the pin provides resiliency while held in the joint so that there will be no noise produced thereby, yet expansion is accommodated, and since braking torque acts as a vertical load at a contact surface between the pin 4 and a connecting hole 8, the surface pressure is maintained at a lower level.

Referring next to FIG. 6, in this embodiment of the invention, the joint made up of members 7 and 10 is permitted to move closer to each other. This is accomplished by making the thickness of the member 10 smaller than the length of the large diameter portion 14 of the pin 4. There is then interposed a clearance formed in the joint by members 7 and 10. A bent plate type of spring which can be formed by bending a rectangular piece of plate in an arc form or by twisting the same is labeled element 20 and serves to prevent a floating or too loose a fit in the joint 7, which further prevents noise. It would be apparent to one skilled in the art that an elastic washer may be used in place of the spring 20.

Referring next to FIGS. 7 through 11, another embodiment of the invention is provided having as a hub a disk with holes. Considering FIG. 7 through 11 together, the brake disk 21 has a braking section 22 and a hub section 23 with connecting pins. Braking section 22 has a plurality of generally trapezoid joints 24 provided on the inner circumferential surface, so as to be projecting. Each of the joints is reduced to approximately half of its thickness and an added center to a connecting hole is provided with a comparatively large diameter. There are a plurality of circular arc recessed portions 26 provided so as to abut the trapezoidal joints.

Figure 7:
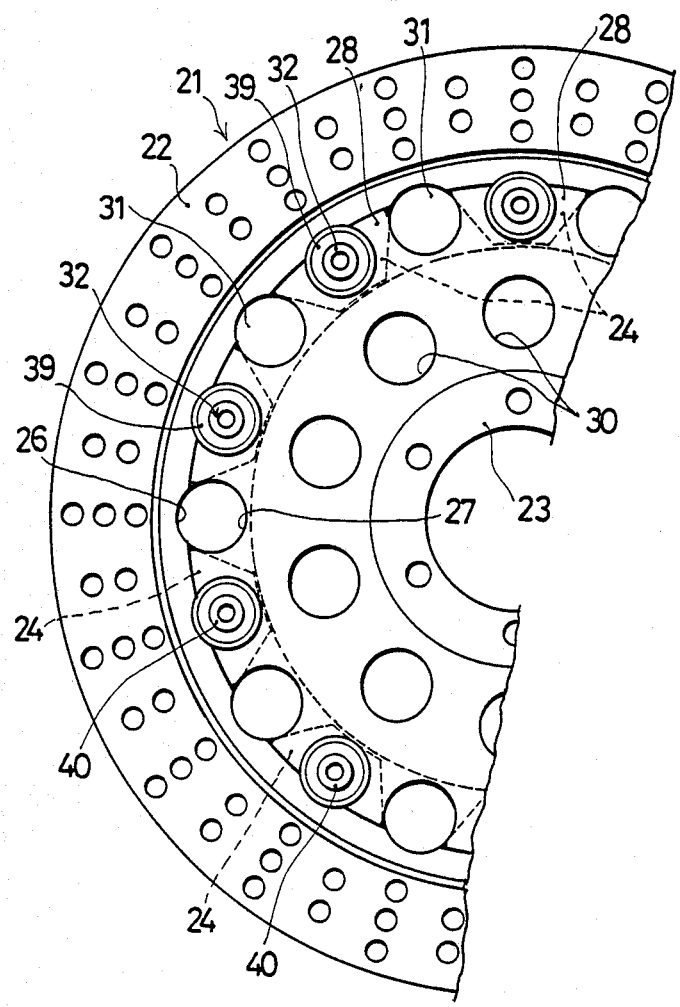
FIG. 7 is a front view of a portion of another embodiment of this invention.
Figure 8:
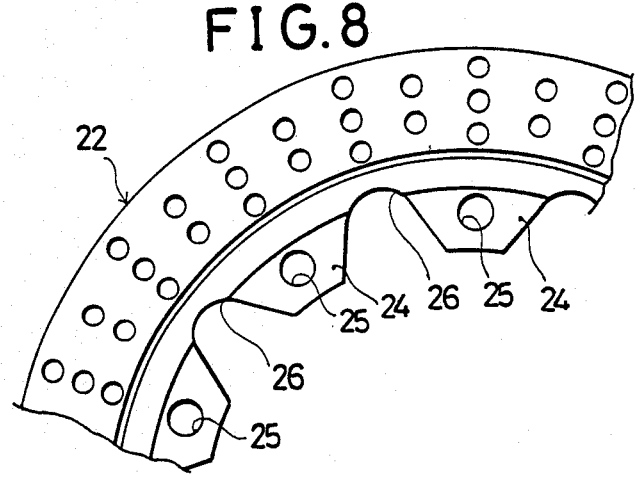
FIG. 8 is a front view of a portion of a braking section of the same embodiment.
Figure 9:
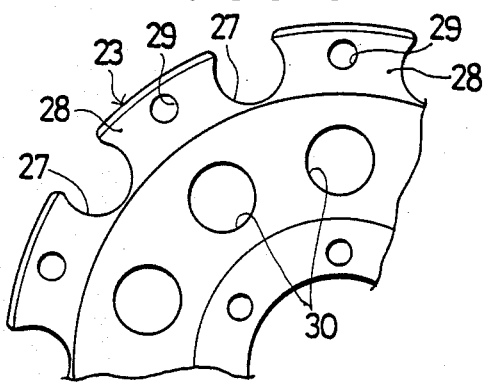
FIG. 9 is a front view of a portion of a hub section of the same embodiment.

Illustrated in more detail in FIG. 9, the hub section 23 has a plurality of joints 28 on the outer circumferential surface so as to be projecting, with each of the joints being separated from the other by a circular arc recessed portion 27 and reduced to approximately half thickness and further provided with a connecting hole 29 which is smaller than the connecting hole 25 in the braking portion. The hub section 23 also has decorative holes 30 and as illustrated in FIG. 7, the recess portions 27 and 26 both combine to form decorative holes 31.

Figure 11:
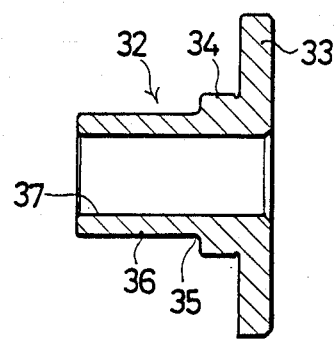
FIG. 11 is a longitudinal sectional view of the connecting pin.

Referring next to FIG. 11, a connecting pin 32 has a head portion 33, a large diameter portion 34, and a small diameter portion 36 with step 35 and is provided with a through hole running along its axial center so that it has the shape of a hollow rivet.

Figure 10:
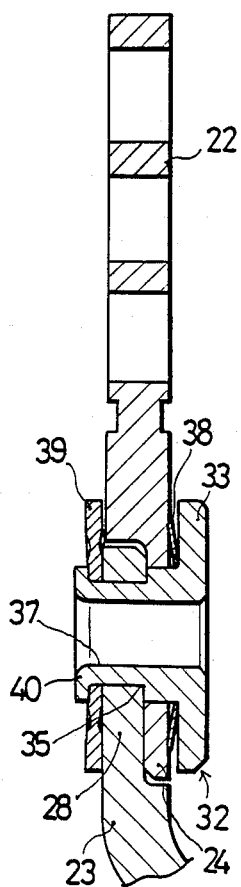
FIG. 10 is a sectional view of portions of FIG. 9.

The assembly is shown in cross section in FIG. 10, wherein both the joints 24 and 28 are overlapped complementarily with respect to each other. A dish spring 38 is placed on the joint 24 and the connecting pin is inserted through them. An elastic washer 39 is fitted therein and the joint 28 is held on the small diameter portion 36 by and between the stepped portion 35 and a caulking portion 40. When so arranged, the joint portion is held in position by and between the head portion 33 at the larger portion 34 and the other joint 28 through the dish shape spring 38. It will be apparent to one skilled in the art that the elastic washer 39 may be replaced by a washer with larger rigidity, and the connecting pin 37 may be either solid or hollow.

In accordance with the invention, the braking section and the hub section are provided with joints connected to each other by means of a connecting pin inserted through those joints. The joints are made approximately half as thick as the remaining portions of the braking and hub sections so that the brake disk assembly is approximately of the same thickness throughout, thus enabling it to be mounted even in a limited space without difficulty.

Further, the connecting pin holds its engagement with the joints through the use of the stepped portion which comes in contact with the side of one of the joints so that it remains held in the proper position free of any slanting that can otherwise be caused by loads.

In addition, with such construction surface pressure acting on the connecting pin and the connecting holes is kept low, because it is normal to the surface and causes no concentrated stressing action. Finally, the connecting pin is resiliently connected with at least one of the joints so that there would be no backlash or loosening which can generate a clattering noise.

What is claimed is

1. A disk brake comprising in combination
   a ring-shaped braking section having a plurality of inner circumferential protruding members,
   each said protruding member having been controlled in thickness to half the thickness of said braking section and,
   each said protruding member having a hole of a first size,
   a hub section having on the outer circumferential portion thereof a plurality equivalent to the plurality of said protruding members on said braking section,
   each said hub section protruding member being controlled in thickness to half of the thickness of said braking section and,
   each said hub section protruding member having a hole of a second size,
   a connecting pin positioned in overlapping joints of a protruding member form each said braking section and said hub section, each said pin having a stepped diameter from a first size corresponding to said first size hole in said braking section to a second size corresponding to said second size hole in said hub section, said pin thereby holding said protrusions of said braking section and of said hub section in overlapped complementary relationship to each other and, a washer positioned on each said pin in retaining relationship.

2. The disk brake of claim 1, wherein said washer is a dish shape spring.

3. The disk brake of claim 1, wherein said head portion of each said pin is formed in the shape of a dish shaped spring.

4. The disk brake of claim 1, wherein there is interposed a spring between said overlapping protrusions.

5. The disk brake of claim 1, wherein there is interposed a spring between the head portion of each said pin and the adjacent protruding portion.

6. The disk brake of claim 1, wherein said connecting pin is hollow.

7. The disk brake of claim 1, wherein said first size is greater than said second size.

8. The disk brake of claim 1, wherein said second size is greater than said first size.

* * * * *

UNITED STATES PATENT AND TRADEMARK OFFICE
CERTIFICATE OF CORRECTION

PATENT NO. : 4,848,521

DATED : Jul. 18, 1989

INVENTOR(S) : Zenzo Izumine

It is certified that error appears in the above-identified patent and that said Letters Patent is hereby corrected as shown below:

On the title page, in item [30] Foreign Application Data, add

--Dec. 21, 1987 [JP] Japan ......................62-193761[U]--.

Signed and Sealed this

Twenty-first Day of August, 1990

Attest:

HARRY F. MANBECK, JR.

*Attesting Officer*  *Commissioner of Patents and Trademarks*